Jan. 16, 1968     R. J. FOREMAN     3,364,410
WINDSHIELD WIPER
Filed Jan. 7, 1965
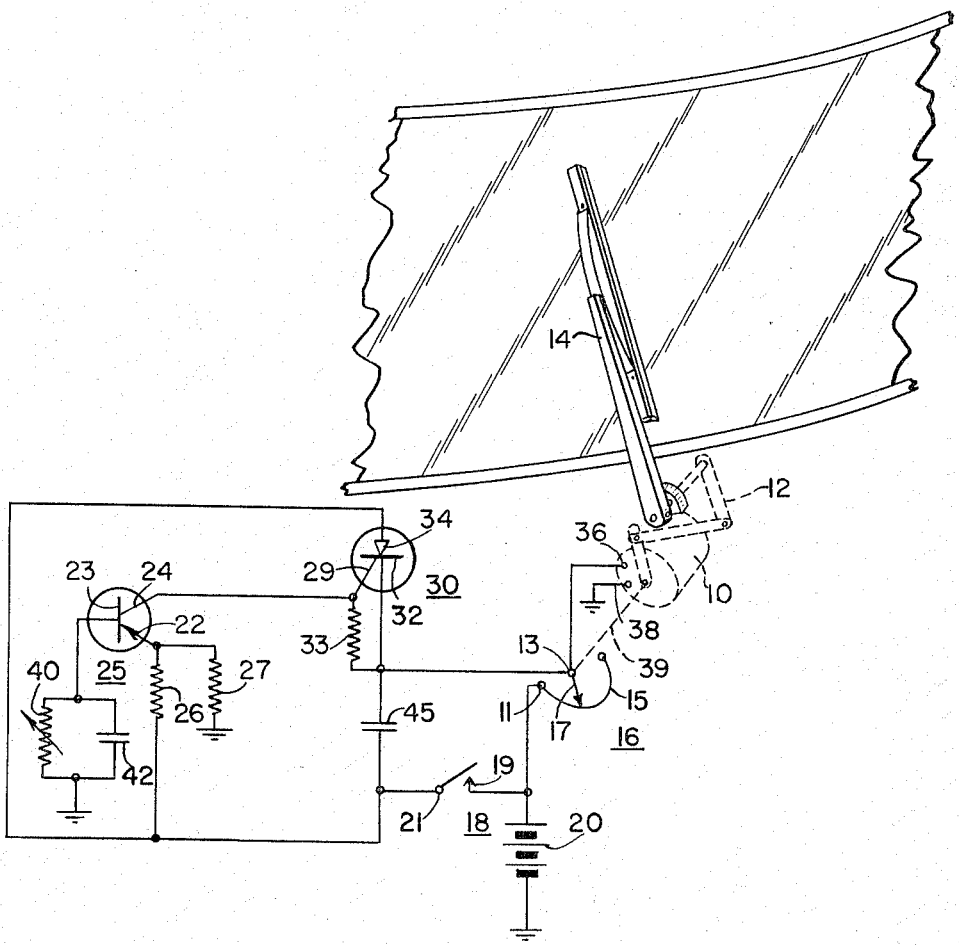
INVENTOR
Roland J. Foreman
BY
Mueller & Aichele
ATTYS.

United States Patent Office 3,364,410
Patented Jan. 16, 1968

3,364,410
WINDSHIELD WIPER
Roland J. Foreman, Franklin Park, Ill., assignor to Motorola, Inc., Franklin Park, Ill., a corporation of Illinois
Filed Jan. 7, 1965, Ser. No. 424,003
4 Claims. (Cl. 318—443)

ABSTRACT OF THE DISCLOSURE

Intermittent operation of a windshield wiper is provided by a control system which includes a silicon controlled rectifier for applying current to the wiper drive motor. A transistor switching device is connected to the gate of the rectifier and controls the same to a conductive condition for energizing the motor. The SCR is coupled to the wiper automatic return switch and is turned off by the switch when the wiper drive motor is energized. A capacitor timing circuit is connected to the transistor switching device and maintains the same in a non-operative condition for a predetermined time interval thereby determining the intermittent period of operation.

---

This invention pertains to a control system for intermittently energizing a cyclicly operated electric device and more particularly to a circuit for intermittently energizing a windshield wiper drive motor.

To observe an inermittently operated instrumentality continuously repeating its operation is annoying and tiring to the observer. For this reason, windshield wipers, although performing an important and necessary function, have often been a source of annoyance and irritation to the car driver. It is usual for windshield wipers in motor vehicles to be specifically driven in a continuous arcuate manner. It is also usual for prior art windshield wipers to be driven at a constant speed because of the relatively high cost of variable speed drive motors. In most cases where intermittently operated drive motors have been used, the motors have not been able to develop their full starting torque at the beginning of each cycle of operation because of the relatively slow turn-on action of the intermittently operated switches used. To provide a system which will develop full starting torque at the beginning of each cycle of operation has required the use of high cost switching devices.

It is, therefore, an object of the present invention to provide an improved electronic control for use in conjunction with an electric device which enables the device to be energized in an intermittent manner with the intermittent rate of operation being controllable.

Another object of this invention is to provide such an improved electronic control which does not use costly, high power transistors or other components.

Still another object of this invention is to provide an improved electronic control for use with an electric motor which enables the motor to be energized in an intermittent manner and to develop full starting torque at each energization.

A further object of the invention is to provide such an improved electronic control which can be readily adapted to the existing type of windshield wiper motor drive assembly.

A feature of this invention is the provision of an electronic control system for intermittent operation of an electric device including a semiconductor switch for firing a silicon controlled rectifier to energize the electric device.

Another feature of this invention is the provision of an electronic control system for intermittent operation of an electric device which includes an automatic return rotary switch responsive to the operation of the electric device, for energizing the electrical device to complete a cycle when it is once energized. A semiconductor switch controls a silicon controlled rectifier for energizing the device, and the rotary switch acts to turn off the silicon rectifier. A variable RC network is charged through the rotary switch to maintain the semiconductor switch in a non-operative condition for a predetermined time interval.

It is to be understood that although the improved control of the present invention has important utility in the drive mechanism of a windshield wiper, and for that reason will be described in such an environment, the invention finds utility wherever it is desired to energize an instrumentality at a controllable intermittent rate.

The invention is illustrated in FIG. 1 of the drawing which is a schematic diagram of a system incorporating a silicon controlled rectifier and used to control the operation of the windshield wiper of a motor vehicle.

The control system of the invention includes a silicon controlled rectifier for energizing a motor or other device. The rectifier is controlled by a semiconductor switching device to which potential is applied by a manually operated switch. This potential forward biases the semiconductor into conduction, and the semiconductor switch is coupled to the silicon controlled rectifier to fire the same to energize the motor, which may operate a windshield wiper. Upon initial rotation, the wiper motor closes the rotating switch which is electrically and mechanically coupled thereto thereby connecting the power supply to the wiper motor to maintain its operation. Upon closing, the rotary switch turns off the silicon rectifier and at the same time applies a potential to a variable RC timing network which is coupled to the semiconductor switch. The charging of the capacitor in the RC network causes the semiconductor to be reverse biased so that the transistor remains non-conducting. The capacitor discharges under control of a parallel resistor, and when it reaches a predetermined point, the semiconductor is once again forward biased. At this time the transistor will conduct again gating the silicon rectifier into conduction and repeating the previously described wipe cycle.

Illustrated in FIG. 1 is an electronic drive motor 10 which is mechanically coupled to a mechanical drive 12 for a windshield wiper 14. The drive motor 10 is also mechanically coupled to a rotary, automatic return switch 16 for the windshield wiper. These components as described are usually incorporated in a single package and are presently available as a commercial item. The switch 16 is usually arranged to cooperate with a mechanical member coupled with a shaft driven by the motor so that it is in a closed position for the purpose of maintaining energization of the drive motor during a substantial portion of the cycle of operation of the wiper. The switch returns to an open position at a predetermined point in the path of traverse of the windshield wiper blade. This position usually coincides with a rest position which is out of view of the driver of the vehicle and is determined by a preset angular position of a rotary member of the wiper drive motor. By this arrangement when the drive motor is once energized, the wiper blade is allowed to complete a cycle and return to its rest position independent of auxiliary wiper control arrangement. The interval between each succeeding stroke, as will be described, is manually controllable in the illustrated embodiment of the invention so that the stroke rate of the windshield wiper may be variable although the speed of the wiper for each stroke is constant. When the instrumentality is turned off, the switch 16 is held closed to return the windshield wiper 14 to its original predetermined position. When the wiper has been returned to its rest position, the mechanical coupling between the motor 10 and the switch 16 causes the switch to open.

The manually operated switch 18 has an input terminal 19 connected to a power supply, for example a 12 volt car battery 20, and an output terminal 21 for energizing the control circuit. The potential at terminal 21 is applied through resistor 26 to the emitter 22 of semiconductor switching device 25, which has a base electrode 23 and a collector electrode 24. The switching device 25 may be a transistor of the PNP type with the emitter being biased through the voltage divider formed by resistor 26 and resistor 27, the latter resistor being connected to a reference potential. The collector 24 is coupled to the gate 29 of silicon controlled rectifier 30, which has a cathode 32 and an anode 34. A resistor 33 connected between the gate 29 and the cathode 32 acts to stabilize the rectifier. The anode 34 of rectifier 30 is coupled to the battery 20 through switch 18. The motor 10 has one terminal 36 connected to the cathode 32 of rectifier 30, with the other terminal 38 being connected to a reference potential.

Applying potential to the emitter 22 by closing switch 18 forward biases the transistor 25 into conduction. The output current from the conducting transistor 25 is coupled to the gate 29 of the rectifier 30 thereby firing the rectifier which applies a potential from battery 20 at terminal 36 of motor 10 to energize the motor.

Energizing the wiper motor 10 causes movement through a mechanical coupling, schematically represented by the dashed line at 39, of arm 17 into engagement with contact 15 of rotary switch 16. Switch 16 has an input terminal 11 connected to the power supply 20 and an output terminal 13 connected to the cathode 32 of rectifier 30, and to terminal 36 of motor 10. Engagement of the arm 17 with the contact 15 connects the cathode 32 and the anode 34 of the rectifier 30 to the same potential, which turns off the rectifier. At the same time the power supply 20 is connected through switch 16 to the terminal 36 of motor 10 to sustain operation of the motor through the remainder of the wipe cycle.

A capacitor 45 coupled between the output terminal 21 of switch 18 and output terminal 13 of switch 16 bypasses a negative-going pulse which is created when the switch 16 is opened. If not bypassed this pulse could possibly gate the rectifier 30 into conduction.

An auxiliary control circuit is used to time the interval between wipe cycles thereby providing intermittent operation of the wiper motor 10. A variable resistor 40 and a capacitor 42 are connected in parallel between the base electrode 23 of transistor 25 and ground potential. When the arm 17 is engaged with the contact 15 of rotary switch 16 during the wipe cycle, a potential is coupled from the output terminal 13 of switch 16, through the cathode 32 and gate 29 of rectifier 30, and through the collector 24 and base 23 of transistor 25, to charge capacitor 42. When the capacitor 42 is charged, it back biases the transistor 25 so that it is cut off. Transistor 25 remains off following the wipe cycle until the capacitor 42 discharges through the resistor 40 to a point where the emitter is again forward biased, as previously described. By adjusting the variable resistor 40, the time required to discharge the capacitor 42, and hence the time interval between energizing pulses to the motor 10, may be varied anywhere from continuous operation of the wiper to a substantially long delay.

The motor 10 operates at full torque for one cycle of operation and then rests for a predetermined time before commencing another cycle of operation. The auxiliary control circuit by using a silicon controlled rectifier can be constructed for a relatively small amount and may be readily adapted and incorporated into existing electric motor type, windshield wiper drive assemblies.

I claim:

1. A control system for intermittently energizing a cyclicly operated windshield wiper drive motor having an automatic return switch mechanically and electrically coupled thereto for operating the drive motor for a predetermined time duration, the control system being energized by a manually operable switch and including in combination, a silicon controlled rectifier for applying current to the drive motor, a semiconductor switching device connected to said rectifier and controlling the same to a conductive condition to energize the drive motor to render the same immediately operative with the manually operable switch first being closed, said rectifier being coupled to the automatic return switch and being turned off thereby upon operation of the drive motor, and timing means coupled to said semiconductor switching device including capacitor means, said capacitor means being charged in response to energization of the drive motor to cut off said semiconductor switching device and maintain the same in a non-operative condition for a predetermined time interval.

2. A control system for intermittently energizing from power supply means a cyclicly operated windshield wiper drive motor having an automatic return switch mechanically and electrically coupled thereto and responsive to operation of the drive motor to energize the same for a predetermined time duration, said system including in combination, a transistor having input, output and control electrodes, said input electrode being selectively connected to the power supply means, energizing means including a silicon controlled rectifier having input, output and gate electrodes, with said input electrode selectively coupled to the power supply means, said output electrode connected to the wiper drive motor, and said gate connected to said output electrode of said transistor, whereby connection of the power supply means to said input electrode forward biases said transistor into conduction firing said rectifier to energize the wiper drive motor, said output electrode of said rectifier being coupled to the automatic return switch and being connected by the return switch to the input electrode of said rectifier upon operation of the drive motor to turn off the rectifier, and timing means coupled to said control electrode of said transistor and being actuated by the return switch to cut off said transistor and maintain the same in a non-operative condition for a predetermined time interval.

3. A control system for intermittently energizing a cyclicly operated windshield wiper drive motor from power supply means including in combination, switch means including a transistor having base, collector and emitter electrodes, said emitter electrode being selectively connected to the power supply means, energizing means including a silicon controlled rectifier having an anode, a cathode and a gate, with said anode selectively coupled to the power supply means, said cathode connected to the wiper drive motor, and said gate connected to said collector electrode of said transistor, whereby selective connection of the power supply means to said emitter electrode forward biases said transistor into conduction firing said rectifier to energize the wiper drive motor, an automatic return switch mechanically coupled to the drive motor and intermittently operated thereby, said return switch having an input connected to the power supply means and an output coupled to said wiper drive motor and to said cathode of said rectifier, said automatic switch being operated by the wiper drive motor to energize the same and connect said cathode of said rectifier to said anode thereof to turn off shaid rectifier, and timing means comprising a variable resistor and a capacitor connected in parallel to said base electrode of said transistor and coupled through said gate and cathode of said rectifier to said output of said automatic return switch, said capacitor being charged through said rotary switch and said collector and base electrodes of said transistor and acting to maintain said transistor biased off for a time interval determined by said variable resistor.

4. A control system for intermittently energizing a cyclicly operated windshield wiper drive motor from power supply means including in combination, a manually operated switch having input and output terminals, said input terminal being connected to the power supply means, switch means including a transistor having base, collector and emitter electrodes, with said emitter electrode being connected to said output terminal of said manual switch, energizing means including a silicon controlled rectifier having an anode, cathode and gate, with said anode connected to said output terminal, said cathode connected to the wiper drive motor, and said gate connected to said collector electrode of said transistor, whereby closing said manual switch forward biases said transistor into conduction firing said rectifier to energize the wiper drive motor, and first and second timing means, said first timing means including a rotary switch having an input connected to said power supply means and an output coupled to said wiper drive motor and to said cathode of said silicon rectifier, said rotary switch being operated by the wiper drive motor to energize the same and connect said cathode of said rectifier to said anode thereof to turn off said rectifier, said second timing means comprising a variable resistor and a capacitor connected in parallel to said base electrode of said transistor and coupled through said gate and cathode of said rectifier to said output of said rotary switch, said capacitor being charged through said rotary switch and acting to maintain said transistor biased off for a time interval determined by said variable resistor.

References Cited

UNITED STATES PATENTS

| 3,219,901 | 11/1965 | Foreman et al. | 318—443 |
| 3,262,042 | 7/1966 | Amos | 318—443 |

ORIS L. RADER, *Primary Examiner.*

J. J. BAKER, *Assistant Examiner.*